United States Patent
Chen

(10) Patent No.: US 10,665,178 B2
(45) Date of Patent: *May 26, 2020

(54) LIQUID CRYSTAL DISPLAY DEVICE AND METHOD FOR DRIVING THE SAME

(71) Applicants: HKC Corporation Limited, Shenzhen (CN); Chongqing HKC Optoelectronics Technology Co., Ltd., Chongqing (CN)

(72) Inventor: Yu-Jen Chen, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 150 days.

This patent is subject to a terminal disclaimer.

(21) Appl. No.: 15/743,953

(22) PCT Filed: May 22, 2017

(86) PCT No.: PCT/CN2017/085339
§ 371 (c)(1),
(2) Date: Jan. 11, 2018

(87) PCT Pub. No.: WO2018/120608
PCT Pub. Date: Jul. 5, 2018

(65) Prior Publication Data
US 2019/0285921 A1    Sep. 19, 2019

(30) Foreign Application Priority Data

Dec. 27, 2016   (CN) .......................... 2016 1 1229076

(51) Int. Cl.
*G09G 3/36* (2006.01)
*G09G 3/34* (2006.01)
(Continued)

(52) U.S. Cl.
CPC ......... *G09G 3/3413* (2013.01); *G02F 1/1368* (2013.01); *G02F 1/13306* (2013.01);
(Continued)

(58) Field of Classification Search
CPC ... G09G 2320/0242; G09G 2320/0285; G09G 2320/029; G09G 2320/0626;
(Continued)

(56) References Cited

U.S. PATENT DOCUMENTS

| | | | |
|---|---|---|---|
| 2011/0032231 A1* | 2/2011 | Maruyama | G09G 3/2096 345/208 |
| 2014/0225877 A1* | 8/2014 | Nakanishi | G09G 3/3648 345/204 |
| 2015/0084939 A1 | 3/2015 | Chen et al. | |

FOREIGN PATENT DOCUMENTS

| | | |
|---|---|---|
| CN | 101377901 A | 3/2009 |
| CN | 102138098 | 7/2011 |

(Continued)

OTHER PUBLICATIONS

International Search Report and Written Opinion of the International Searching Authority, dated Sep. 10, 2017, from International Application No. PCT/CN2017/085339, filed on May 22, 2017. 13 pages.

*Primary Examiner* — Insa Sadio
(74) *Attorney, Agent, or Firm* — HoustonHogle LLP

(57) ABSTRACT

A method for driving an LCD device includes displaying each picture with two frame images sequentially; the two frame images includes a first frame image and a second frame image; driving voltages for two adjacent sub-pixels in each of the frame images are different, and driving voltages in the first frame image and the second frame image for each of the sub-pixels are different; determining backlight brightness regulation signals for each of the backlight subareas; the backlight regulation signals are grouped signals, the
(Continued)

number of the groups is identical to the number of types of the color sub-pixels; calculating an average color purity of a current picture area corresponding to each backlight subarea; determining whether the average color purity of each of the backlight subareas is within a preset range; if yes, performing a brightness regulation to a backlight source of the backlight subarea in each of the frame images of a next picture according to the backlight brightness regulation signal of the backlight subarea.

14 Claims, 4 Drawing Sheets

(51) Int. Cl.
*G02F 1/133* (2006.01)
*G09G 3/20* (2006.01)
*G02F 1/13357* (2006.01)
*G02F 1/1368* (2006.01)
*G02F 1/1345* (2006.01)

(52) U.S. Cl.
CPC ...... *G02F 1/13452* (2013.01); *G02F 1/13454* (2013.01); *G02F 1/133602* (2013.01); *G02F 1/133611* (2013.01); *G09G 3/2003* (2013.01); *G09G 3/3426* (2013.01); *G09G 3/3607* (2013.01); *G09G 3/3648* (2013.01); *G09G 3/3666* (2013.01); *G02F 1/133621* (2013.01); *G02F 2001/133601* (2013.01); *G09G 2300/0426* (2013.01); *G09G 2300/0452* (2013.01); *G09G 2310/08* (2013.01); *G09G 2320/028* (2013.01); *G09G 2320/0233* (2013.01); *G09G 2320/0247* (2013.01); *G09G 2320/0285* (2013.01); *G09G 2320/066* (2013.01); *G09G 2320/0626* (2013.01); *G09G 2320/0646* (2013.01); *G09G 2360/16* (2013.01)

(58) Field of Classification Search
CPC .. G09G 2360/16; G09G 3/3413; G09G 3/342; G09G 3/3426; G09G 3/3607; G09G 3/3614
See application file for complete search history.

(56) References Cited

FOREIGN PATENT DOCUMENTS

| | | |
|---|---|---|
| CN | 104360556 | 2/2015 |
| CN | 105047142 A | 11/2015 |
| CN | 105355181 | 2/2016 |
| CN | 105609060 A | 5/2016 |
| CN | 105788549 A | 7/2016 |
| CN | 105974693 A | 9/2016 |
| KR | 20130020308 A | 2/2013 |

* cited by examiner

The first frame       The second frame

LIQUID CRYSTAL DISPLAY DEVICE AND METHOD FOR DRIVING THE SAME

CROSS REFERENCE TO RELATED APPLICATION

This is a § 371 National Phase Application of International Application No. PCT/CN2017/085339, filed on May 22, 2017, which application claims priority to Chinese Patent Application No. 201611229076.7, entitled "LIQUID CRYSTAL DISPLAY DEVICE AND METHOD FOR DRIVING THE SAME" filed on Dec. 27, 2016, the contents of which are expressly incorporated by reference herein in their entirety.

FIELD OF THE INVENTION

The present disclosure relates to a liquid crystal display (LCD) technology field, and particularly relates to an LCD device and a method for driving the same.

BACKGROUND OF THE INVENTION

Most conventional large size LCDs adopt negative Vertical Alignment (VA) liquid crystal display or In-plane Switching (IPS) liquid crystal display technology. As to the driving of an VA LCD, in a large viewing angle, the brightness is rapidly saturated with the driving voltage, such that the viewing angle color shift is serious and the quality of the image is affected.

SUMMARY OF THE INVENTION

According to various embodiments of the present application, an LCD device and a method for driving the same are provided, which can improve the defect of viewing color cast.

A method for driving an LCD device includes: displaying each picture with two frame images sequentially; the two frame images include a first frame image and a second frame image; driving voltages for two adjacent sub-pixels in each of the frame images are different, and driving voltages in the first frame image and the second frame image for each of the sub-pixels are different; determining backlight brightness regulation signals for each of the backlight subareas according to driving voltages of a first frame image area and a second frame image area which are corresponding to each of the backlight subareas; the backlight regulation signals are grouped signals, the number of the groups is identical to the number of types of the color sub-pixels; and performing independent brightness regulations to a backlight source of various color sub-pixels in the backlight subarea in each of the frame images of a next picture according to the backlight brightness regulation signal of the backlight subarea.

In an embodiment, the driving voltages for each of the sub-pixels in the first frame image and the second frame image are looked up and acquired utilizing a Look-up Table (LUT) according to an input signal of each picture.

In an embodiment, further includes a step of pre-storing the LUT.

In an embodiment, the step of determining backlight brightness regulatory signals for each of the backlight subareas according to driving voltages of the first frame image area and the second frame image area which are corresponding to each of the backlight subareas further includes: calculating average driving voltages for various color sub-pixels in the first frame image area and the second frame image area which are corresponding to each of the backlight subareas; and calculating a backlight brightness regulation signal according to the average driving voltage, a reference backlight brightness signal and a reference driving voltage.

In an embodiment, in the step of calculating a backlight brightness regulation signal according to the average driving voltage, a reference backlight brightness signal and a reference driving voltage, the formulas to calculate the backlight brightness regulation signal of each of the color sub-pixels in each of the backlight subareas are:

$$A_{M\_P1}*P_{M\_ave1}=A_{M\_P2}*P_{M\_ave2};$$

$$2*A_{M\_P}*P_{M\_ave}=A_{M\_P1}*P_{M\_ave1}+A_{M\_P2}*P_{M\_ave2};$$

P is a target color sub-pixel; M is a serial number of the backlight subarea, $A_{M\_P1}$ is the backlight brightness regulation signal to perform the backlight brightness regulation to the backlight source of a P sub-pixel in a backlight subarea M corresponding to the first frame image of the next picture; $A_{M\_P2}$ is the backlight brightness regulation signal to perform a backlight brightness regulation to the backlight source of the P sub-pixel in the backlight subarea M corresponding to the second frame image of the next picture; $P_{M\_ave1}$ is an average value of the driving voltage of the P sub-pixel in the backlight subarea M corresponding to the first frame image of the current picture; $P_{M\_ave2}$ is an average value of the driving voltage of the P sub-pixel in the backlight subarea M corresponding to the second frame image of the current picture; $A_{M\_P}$ is the reference backlight brightness signal of the P sub-pixel in the backlight subarea M corresponding to the image of the current picture; $P_{M\_ave}$ is the average value of the reference driving voltage of the P sub-pixel in the frame image area corresponding to the backlight subarea M on the image of the current picture.

In an embodiment, the types of color sub-pixels in each of the frame images at least include a red sub-pixel, green sub-pixels and blue sub-pixels; the backlight brightness regulation signals include a red sub-pixel backlight brightness regulation signal, a green sub-pixel backlight brightness regulation signal and a blue sub-pixel backlight brightness regulation signal, to perform independent backlight regulations to various color sub-pixels.

An LCD device, comprising: a display panel; a backlight module configured to provide backlight to the display panel; the backlight module is divided into a plurality of backlight subareas; a driving element connected to the display panel and configured to display each picture with two frame images sequentially; the two frame images include a first frame image and a second frame image; driving voltages for two adjacent sub-pixels in each of the frame images are different, and driving voltages in the first frame image and the second frame image for each of the sub-pixels are different; a backlight control element connected to the driving element, the backlight control element is configured to determine backlight brightness regulation signals for each of the backlight subareas according to driving voltages of a first frame image area and a second frame image area which are corresponding to each of the backlight subareas; the backlight regulation signals are grouped signals, the number of the groups is identical to the number of types of the color sub-pixels; and a backlight regulation element connected to the backlight control element and the backlight module respectively; the backlight regulation element is configured to perform independent brightness regulations to a backlight source of various color sub-pixels in the corresponding backlight subarea in each of the frame images of a next picture according to the backlight brightness regulation signals of each of the backlight subareas.

In an embodiment, further included is a storage element configured to store an LUT; the LUT is a correspondence table on input signals and the driving voltages for each of the sub-pixels in the first frame image and the second frame image which are corresponding to the input signals; the driving element acquires the driving voltages for each of the sub-pixels of the first frame image and the second frame image by looking in the LUT.

In an embodiment, the backlight control part includes one or more processors, and memory storing instructions, which, when executed by the one or more processors cause the one or more processors to provide:

a statistic unit configured to calculate average driving voltages for various color sub-pixels in the first frame image area and the second frame image area which are corresponding to each of the backlight subareas; and a calculation unit configured to calculate a backlight brightness regulation signal according to the average driving voltage, a reference backlight brightness signal and a reference driving voltage of each of the backlight subareas.

In an embodiment, the formulas to calculate the backlight brightness regulation signal of each of the color sub-pixels in each of the backlight subareas are:

$$A_{M\_P1}*P_{M\_ave1}=A_{M\_P2}*P_{M\_ave2};$$

$$2*A_{M\_P}*P_{M\_ave}=A_{M\_P1}*P_{M\_ave1}+A_{M\_P2}*P_{M\_ave2};$$

P is a target color sub-pixel; M is a serial number of the backlight subarea, $A_{M\_P1}$ is the backlight brightness regulation signal to perform the backlight brightness regulation to the backlight source of a P sub-pixel in a backlight subarea M corresponding to the first frame image of the next picture; $A_{M\_P2}$ is the backlight brightness regulation signal to perform a backlight brightness regulation to the backlight source of the P sub-pixel in the backlight subarea M corresponding to the second frame image of the next picture; $P_{M\_ave1}$ is an average value of the driving voltage of the P sub-pixel in the backlight subarea M corresponding to the first frame image of the current picture; $P_{M\_ave2}$ is an average value of the driving voltage of the P sub-pixel in the backlight subarea M corresponding to the second frame image of the current picture; $A_{M\_P}$ is the reference backlight brightness signal of the P sub-pixel in the backlight subarea M corresponding to the image of the current picture; $P_{M\_ave}$ is the average value of the reference driving voltage of the P sub-pixel in the frame image area corresponding to the backlight subarea M on the image of the current picture.

In an embodiment, the backlight source is a direct-lit backlight source or an edge-lit backlight source.

An LCD device, including: a display panel; a backlight module configured to provide backlight to the display panel; the backlight module is divided into a plurality of backlight subareas; a driving element connected to the display panel and configured to display each picture with two frame images sequentially; the two frame images include a first frame image and a second frame image; driving voltages for two adjacent sub-pixels in each of the frame images are different, and driving voltages in the first frame image and the second frame image for each of the sub-pixels are different; a backlight control element connected to the driving element, the backlight control element is configured to determine backlight brightness regulation signals for each of the backlight subareas according to driving voltages of a first frame image area and a second frame image area which are corresponding to each of the backlight subareas; the backlight regulation signals are grouped signals, the number of the groups is identical to the number of types of the color sub-pixels; and a backlight regulation element connected to the backlight control element and the backlight module respectively; the backlight regulation element is configured to perform independent brightness regulations to a backlight source of various color sub-pixels in the corresponding backlight subarea in each of the frame images of a next picture according to the backlight brightness regulation signals of each of the backlight subareas; the backlight control part includes one or more processors, and memory storing instructions, which, when executed by the one or more processors cause the one or more processors to provide: a statistic unit configured to calculate average driving voltages for various color sub-pixels in the first frame image area and the second frame image area which are corresponding to each of the backlight subareas; and a calculation unit configured to calculate a backlight brightness regulation signal according to the average driving voltage, a reference backlight brightness signal and a reference driving voltage of each of the backlight subareas, the calculation formula is as follows:

$$A_{M\_P1}*P_{M\_ave1}=A_{M\_P2}*P_{M\_ave2};$$

$$2*A_{M\_P}*P_{M\_ave}=A_{M\_P1}*P_{M\_ave1}+A_{M\_P2}*P_{M\_ave2};$$

P is a target color sub-pixel; M is a serial number of the backlight subarea, $A_{M\_P1}$ is the backlight brightness regulation signal to perform the backlight brightness regulation to the backlight source of a P sub-pixel in a backlight subarea M corresponding to the first frame image of the next picture; $A_{M\_P2}$ is the backlight brightness regulation signal to perform a backlight brightness regulation to the backlight source of the P sub-pixel in the backlight subarea M corresponding to the second frame image of the next picture; $P_{M\_ave1}$ is an average value of the driving voltage of the P sub-pixel in the backlight subarea M corresponding to the first frame image of the current picture; $P_{M\_ave2}$ is an average value of the driving voltage of the P sub-pixel in the backlight subarea M corresponding to the second frame image of the current picture; $A_{M\_P}$ is the reference backlight brightness signal of the P sub-pixel in the backlight subarea M corresponding to the image of the current picture; $P_{M\_ave}$ is the average value of the reference driving voltage of the P sub-pixel in the frame image area corresponding to the backlight subarea M on the image of the current picture.

In an embodiment, further included is a storage element configured to store an LUT; the LUT is a correspondence table on input signals and the driving voltages for each of the sub-pixels in the first frame image and the second frame image which are corresponding to the input signals; the driving element acquires the driving voltages for each of the sub-pixels of the first frame image and the second frame image by looking in the LUT.

In an embodiment, the backlight source is a direct-lit backlight source or an edge-lit backlight source.

The above LCD driving method, by displaying each picture with two frame images sequentially, each of the frame images is alternately driven by high and low voltage signals, and the high and low driving voltages of the first frame image and second frame image are reverted, and the backlight brightness regulation signals of the next picture are generated in accordance to each driving voltage to perform independent backlight regulation to the backlight sources of various color sub-pixels in the corresponding backlight subarea in each of the frame images of the next picture, thereby reducing the uncomfortable blink visible to the eyes and due to the high low voltage switching in reducing the driving voltage and effectively improving the color cast deficiency of an LCD caused by refractive rate mismatch in large viewing angle.

BRIEF DESCRIPTION OF THE DRAWINGS

The above objects, features and advantages of the present disclosure will become more apparent by describing in detail embodiments thereof with reference to the accompanying drawings. The components in the drawings are not necessarily drawn to scale, the emphasis instead being placed upon clearly illustrating the principles of the present disclosure.

DETAILED DESCRIPTION OF THE EMBODIMENTS

The present invention will be described in the following with reference to the accompanying drawings and the embodiments. In order to make the above objects, features and advantages of the present disclosure become more apparent, the specific embodiments will be described in detail in combination with the accompanying drawings. Numerous specific details are described hereinafter in order to facilitate a thorough understanding of the present disclosure. The various embodiments of the disclosure may, however, be embodied in many different forms and should not be construed as limited to the specific embodiments set forth hereinafter, and people skilled in the art can make similar modifications without departing from the spirit of the present disclosure.

Figure 1:
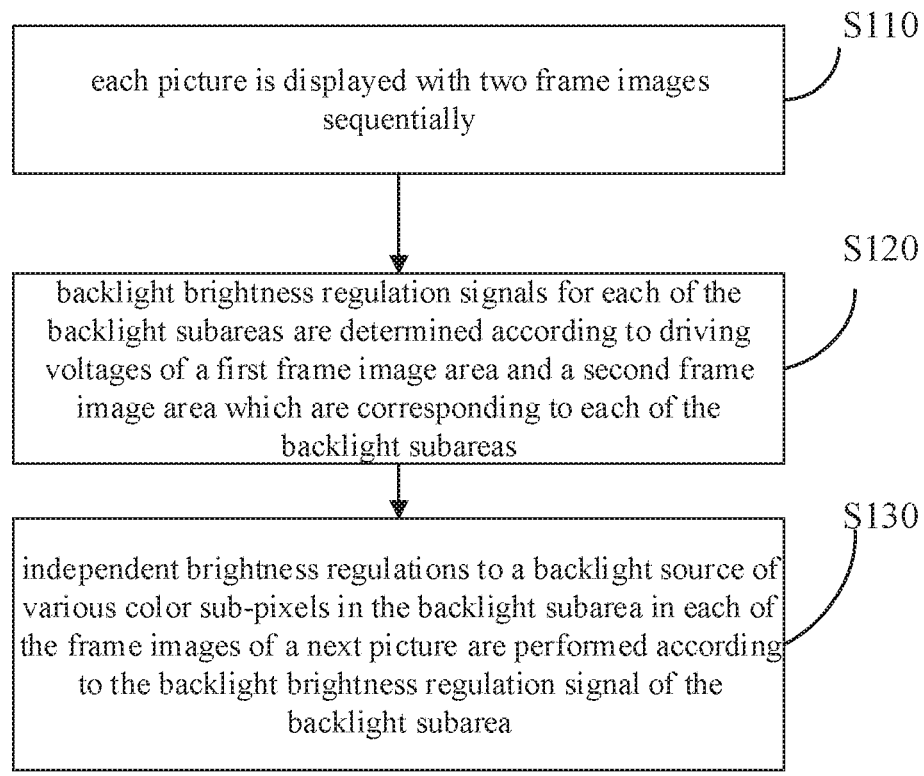
FIG. 1 is a flowchart of a method for driving an LCD device according to an embodiment.
Figure 2:
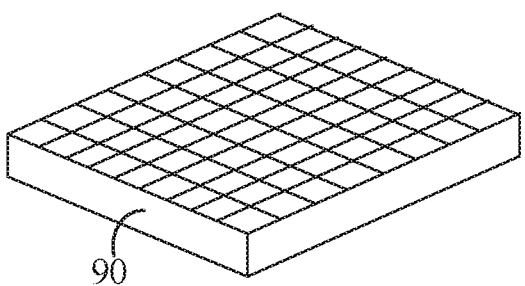
FIG. 2 is a schematic view of dividing a backlight area of the LCD device in FIG. 1.

FIG. 1 is a flowchart of a method for driving an LCD device according to an embodiment. The LCD device can be a Twisted Nematic (TN), an Optically Compensated Bend (OCB), a Vertical Alignment (VA) or a curved surface device but not limited thereto. The backlight of the LCD may apply a direct-lit backlight or an edge-lit backlight source, the backlight source can be white, RGB three color light source, RGBW four color light source or RGBY four color light source, but not limited thereto. In the present embodiment, the backlight area of the LCD is divided into several backlight subareas as illustrated in FIG. 2. In FIG. 2, 90 represents the backlight module.

Referring to FIG. 1, the method includes the following steps:

Step S110, each picture is displayed with two frame images sequentially.

Figure 3:
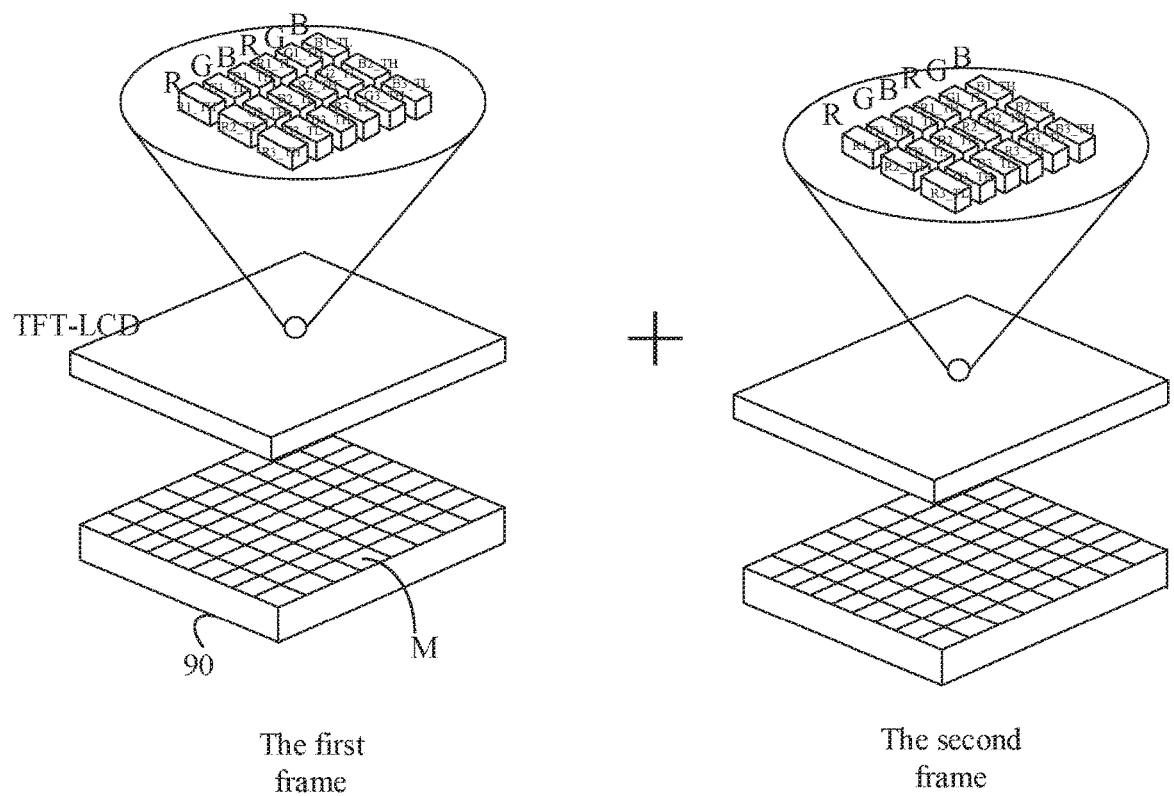
FIG. 3 is a schematic view of driving a display area of the LCD device in FIG. 1.
Figure 4:
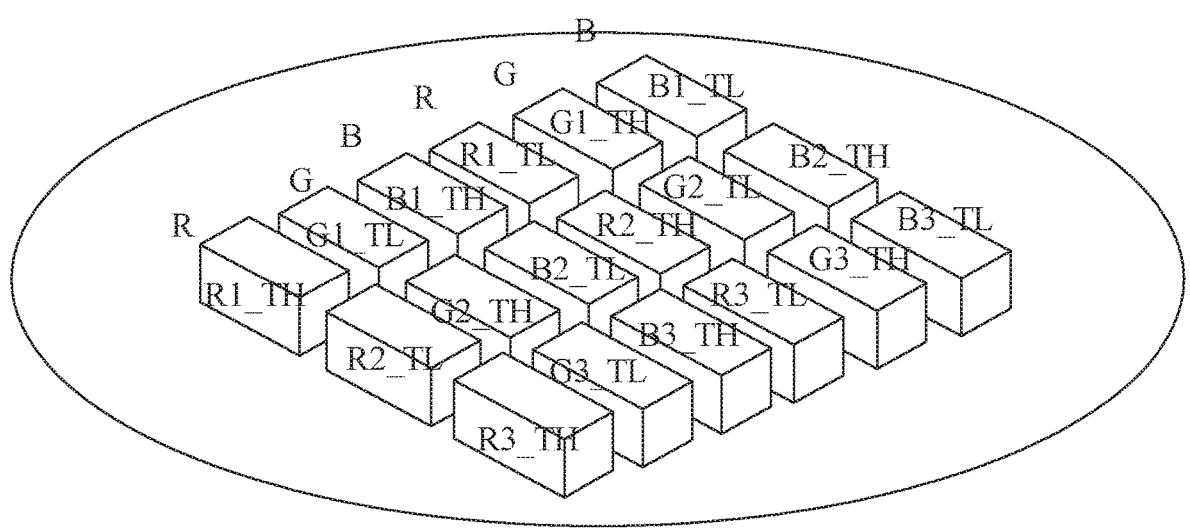
FIGS. 4 and 5 are enlarged views of FIG. 3.
Figure 5:
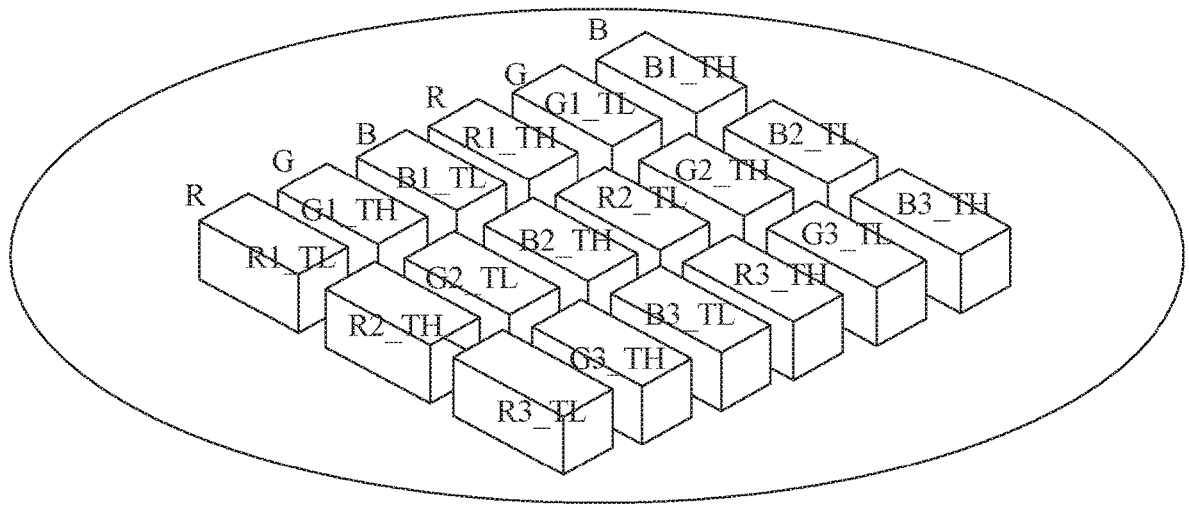

Each picture frame_N (i.e., the conventional one frame picture) is displayed with two frame images sequentially, i.e., a picture is divided into two frame images in timing sequence. Through a division to the picture in timing sequence, a frequency doubling can be effected to the frame frequency, i.e., doubling the original 60 Hz to 120 Hz. The two frame images are respectively a first frame image (frame_N-1) and a second frame image (frame_N-2). Through a mutual compensation between the first frame image and the second frame image, a picture corresponding to the input signal is displayed for a user. In the present embodiment, driving voltages for two adjacent sub-pixels in each of the frame images are different, and driving voltages in the first frame image and the second frame image for each of the sub-pixels are different; i.e., the driving voltage for each sub-pixel of the first frame image is reverted to be the driving voltage for each sub-pixel in the second frame image. The driving voltages for each of the sub-pixels in the first frame image and the second frame image can be looked up and acquired utilizing a Look-up Table (LUT). In particular, in the LCD device, the LUT will be pre-stored in the hardware frame buffer. The LUT is a correspondence table on the picture input signals and the driving voltages for each of the sub-pixels in the first frame image and the second frame image which are corresponding to the input signals. In the case of a driving signal of 8 bit, corresponding to each R/G/B input signal input color gray scale value 0~255, there are 256 pairs of high and low voltage signals RTH/GTH/BTH, and 3*256 pairs of high and low voltage signals RTL/GTL/BTL in total. Therefore, according to the gray scale value of each of the sub-pixels in the input signal, corresponding high driving voltage and corresponding low driving voltage can be looked up, thereby providing the high driving voltage as the driving voltage for the corresponding sub-pixel in the first frame image and the low driving voltage as the driving voltage for the corresponding sub-pixel in the second frame image, or providing the low driving voltage as the driving voltage for the corresponding sub-pixel in the first frame image and the high driving voltage as the driving voltage for the corresponding sub-pixel in the second frame image, while the two adjacent sub-pixels employ a driving method for being alternately driven by a high and a low driving voltage as shown in FIG. 3. FIG. 4 is an enlarged view of a part of the first frame in FIG. 3, and FIG. 5 is an enlarged view of a part of the second frame in FIG. 3.

Step S120, backlight brightness regulation signals for each of the backlight subareas are determined according to driving voltages of a first frame image area and a second frame image area which are corresponding to each of the backlight subareas.

The backlight brightness regulation signal is used for backlight brightness regulation to the backlight brightness of the two frame images of the next picture to reduce the viewing angle color shift. The backlight regulation signals are grouped signals ($A_{M\_P1}$ and $A_{M\_P2}$, P is the target color sub-pixel) to respectively regulate the backlight brightness of the backlight subareas corresponding to the first frame image and the second frame image. And the groups of backlight brightness regulation signals and the types of color sub-pixels are identical in number, so as to perform an independent backlight brightness control to various color sub-pixels. For instance, in the present embodiment, color sub-pixels include red sub-pixels (R sub-pixels), green sub-pixels (G sub-pixels) and blue sub-pixels (B sub-pixels), therefore each group of backlight brightness regulation signals includes a R sub-pixel backlight brightness regulation signal group, a G sub-pixel backlight brightness regulation signal group, and a B sub-pixel backlight brightness regulation signal group to perform independent backlight brightness regulation control to various color sub-pixels in each of the backlight subareas.

Figure 6:
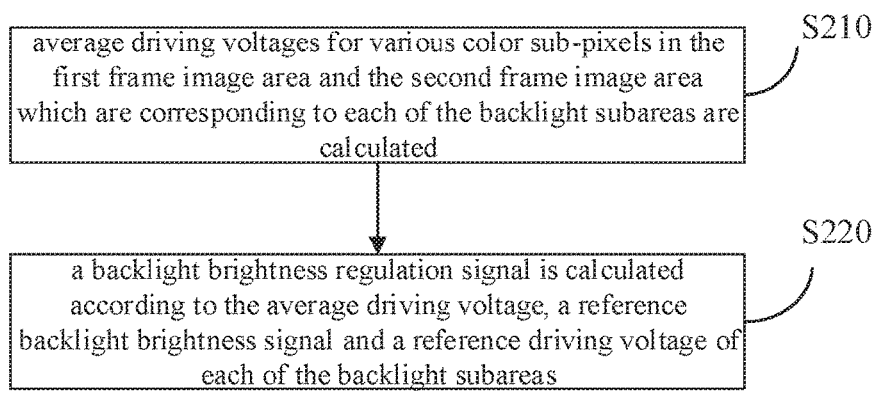
FIG. 6 is a specific flowchart of step S120 in FIG. 1.

In the present embodiment, the process to determine the backlight luminance compensation signal is illustrated in FIG. 6, which includes steps S210 and step S220.

Step S210, average driving voltages for various color sub-pixels in the first frame image area and the second frame image area which are corresponding to each of the backlight subareas are calculated.

The formula for calculating average driving voltages for various color sub-pixels in the first frame image area corresponding to each backlight subarea is as follows:

$$P_{M\_ave1}=Ave(P_{M\_n\_TL}, P_{M\_n+1\_TH}, P_{M\_n+2\_TL}, \ldots),$$
$$n=1, 2, 3 \ldots$$

P is the target color sub-pixel, M is the serial number for the backlight subarea, ave1 is the average driving voltage value of the first frame image; and n is the serial number of P sub-pixel in backlight subarea M.

In Particular, the average driving voltage for various color sub-pixels is calculated as:

$$R_{M\_ave1}=Ave(R_{M\_n\_TL}, R_{M\_n+1\_TH}, R_{M\_n+2\_TL}, \ldots),$$
$$n=1, 2, 3 \ldots;$$

$$G_{M\_ave1}=Ave(G_{M\_n\_TH}, G_{M\_n+1\_TL}, G_{M\_n+2\_TH}, \ldots),$$
$$n=1, 2, 3 \ldots;$$

$$B_{M\_ave1}=Ave(B_{M\_n\_TL}, B_{M\_n+1\_TH}, B_{M\_n+2\_TL}, \ldots),$$
$$n=1, 2, 3 \ldots.$$

Step S220, a backlight brightness regulation signal is calculated according to the average driving voltage, a reference backlight brightness signal and a reference driving voltage of each of the backlight subareas.

The reference backlight brightness signal refers to a backlight brightness signal that is required when a high low voltage compensation is not performed (i.e., in conventional driving method). The reference driving voltage refers to the driving voltage for various sub-pixels when the high low voltage compensation is not performed. As backlight sources corresponding to various color sub-pixels in each subarea are controlled independently, the backlight brightness regulation signals of the backlight sources corresponding to various color sub-pixels in each subarea needs to be calculated. The formulas to calculate the backlight brightness regulation signal of each color sub-pixel in each backlight subarea M are:

$$A_{M\_P1}*P_{M\_ave1}=A_{M\_P2}*P_{M\_ave2};$$

$$2*A_{M\_P}*P_{M\_ave}=A_{M\_P1}*P_{M\_ave1}+A_{M\_P2}*P_{M\_ave2}.$$

P is the target color sub-pixel; M is the serial number of the backlight subarea, $A_{M\_P1}$ is the backlight brightness regulation signal to perform the backlight brightness regulation to the backlight source of the P sub-pixel in the backlight subarea M corresponding to the first frame image of the next picture. $A_{M\_P2}$ is the backlight brightness regulation signal to perform the backlight brightness regulation to the backlight source of the P sub-pixel in the backlight subarea M corresponding to the second frame image of the next picture. $P_{M\_ave1}$ is the average value of the driving voltage of the P sub-pixel in the backlight subarea M corresponding to the first frame image of the next picture. In the present embodiment, as the driving voltage of sub-pixel is matched with the input signal (i.e., the gray scale of the corresponding color), thereby allowing the average value of the driving voltage to be an evaluating index of the viewing angle brightness of the color sub-pixel. $P_{M\_ave2}$ is the average value of the driving voltage of the P sub-pixel in the backlight subarea M corresponding to the second frame image of the next picture. $A_{M\_P}$ is the reference backlight brightness signal of the P sub-pixel in the backlight subarea M corresponding to the image of the current picture. $P_{M\_ave}$ is the average value of the reference driving voltage of the P sub-pixel in the frame image region corresponding to the backlight subarea M on the image of the current picture. In particular, $P_{M\_ave1}=Ave(P_n+P_{n+1}+P_{n+2}+ \ldots )$, n=1, 2, 3 ...

In the present embodiment, each pixel in each of the frame images includes a R sub-pixel, a G sub-pixel and a B sub-pixel. Therefore, backlight brightness regulation signals of backlight source for various color sub-pixel in each backlight subarea need to be calculated correspondingly, in particular:

The formulas to calculate the backlight brightness regulation signals $A_{M\_R1}$ and $A_{M\_R2}$ of R sub-pixels in the backlight subarea M are:

$$A_{M\_R1}*R_{M\_ave1}=A_{M\_R2}*R_{M\_ave2};$$

$$2*A_{M\_P}*R_{M\_ave}=A_{M\_R1}*R_{M\_ave1}+A_{M\_R2}*R_{M\_ave2};$$

The formulas to calculate the backlight brightness regulation signals $A_{M\_G1}$ and $A_{M\_G2}$ of R sub-pixels in the backlight subarea M are:

$$A_{M\_G1}*G_{M\_ave1}=A_{M\_G2}*G_{M\_ave2};$$

$$2*A_{M\_G}*P_{M\_ave}=A_{M\_G1}*P_{M\_ave1}+A_{M\_G2}*P_{M\_ave2};$$

The formulas to calculate the backlight brightness regulation signals $A_{M\_B1}$ and $A_{M\_B2}$ of R sub-pixels in the backlight subarea M are:

$$A_{M\_B1}*B_{M\_ave1}=A_{M\_B2}*B_{M\_ave2};$$

$$2*A_{M\_B}*P_{M\_ave}=A_{M\_B1}*P_{M\_ave1}+A_{M\_B2}*P_{M\_ave2}.$$

Step S130, independent brightness regulations to a backlight source of various color sub-pixels in the backlight subarea in each of the frame images of a next picture are performed according to the backlight brightness regulation signal of the backlight subarea.

In the regulation, independent regulations are performed to the backlight sources of R sub-pixel, G sub-pixel and B sub-pixel in the backlight subarea M corresponding to the first frame image of the next picture according to $A_{M\_R1}$, $A_{M\_G1}$ and $A_{M\_B1}$, and independent regulations are performed to the backlight sources of R sub-pixel, G sub-pixel and B sub-pixel in the backlight subarea M corresponding to the second frame image of the next picture according to $A_{M\_R2}$, $A_{M\_G2}$ and $A_{M\_B2}$, such that the compensated image brightness is the same as that when no high low voltage compensation is performed (i.e., the conventional driving). Through an independent backlight source control, the uncomfortable blink notable to the eyes and caused by high and low voltage switching difference in the driving can be reduced, thereby effectively ameliorating the color shift defect of LCD in large viewing angle refraction mismatch.

The above LCD driving method, by displaying each picture with two frame images sequentially, each of the frame images is alternately driven by high and low voltage signals, and the high and low driving voltages of the first frame image and second frame image are reverted, and the backlight brightness regulation signals of the next picture are generated in accordance to each driving voltage to perform independent backlight regulation to the backlight sources of various color sub-pixels in the corresponding backlight subarea in each of the frame images of the next picture. The above driving method, aided with a compensation to the brightness of each backlight subarea M, not only can maintain the overall panel brightness to be the same with the brightness of the uncompensated conventional driving, but also can effect a low color shift viewing angle compensation and avoid the original uncomfortable blink notable to the eyes and caused by high and low voltage switching difference in the driving, thereby effectively ameliorating the color cast deficiency of LCD in large viewing angle refractive rate mismatch. The above driving method can effect a coordinated driving in timing and space. Also, by employing the method for driving above, the pixels of the LCD device are no longer needed to be divided into primary and secondary sub-pixels, thereby greatly reducing the process complexity and remarkably increasing the penetration rate and resolution of the LCD panel and reducing the cost of backlight design.

Figure 7:
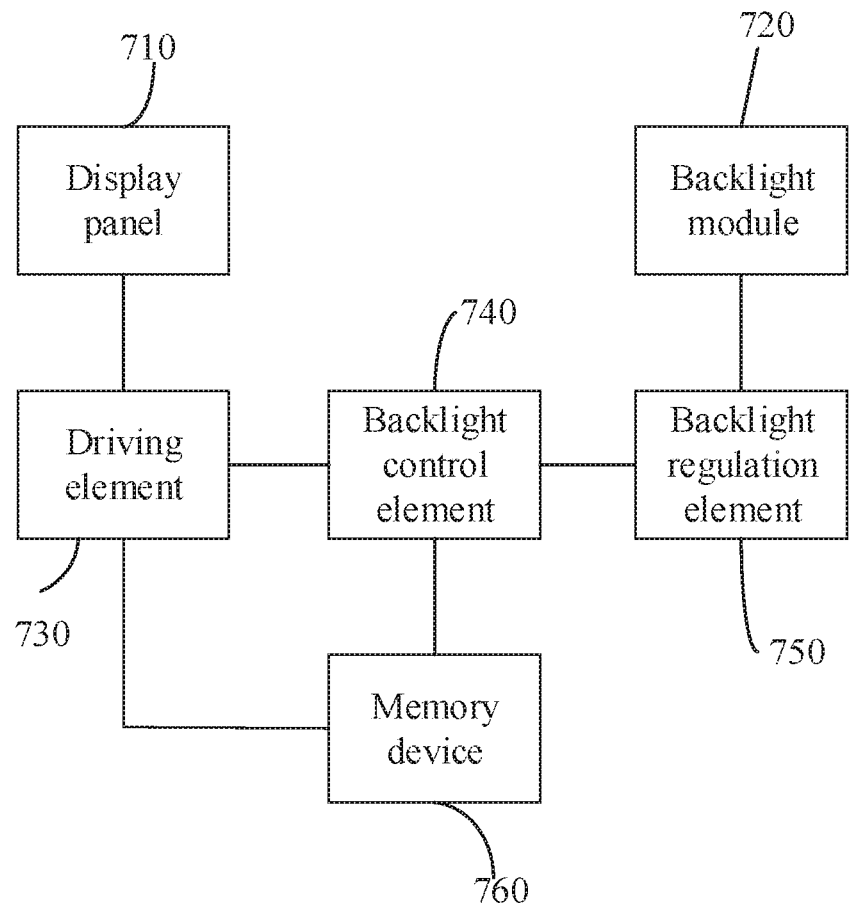
FIG. 7 is a block diagram of a structure of an LCD device according to an embodiment.

The present application also provides an LCD as illustrated in FIG. 7. The LCD can execute the above driving method. The LCD includes a display panel 710, a backlight module 720, a driving element 730, a backlight control element 740 and a backlight regulation element 750. The display panel 710 and the driving element 730 can be integrated on the display panel, while the backlight module 720, the backlight control element 740 and the backlight regulation element 750 can be integrated on the backlight module. It should be understood that the integrating of each elements is not limited thereto.

The display panel 710 can adopt TN, OCB, VA, thin film transistor (TFT) and color filter on array (COA) display panel, but not limited thereto. The display panel 710 can be a display panel with a curved panel.

The backlight module 720 is configured to provide backlight. The backlight module 720 may apply a direct-lit backlight or an edge-lit backlight source, the backlight source can be white, RGB three color light source, RGBW four color light source or RGBY four color light source, but not limited thereto. The backlight area of the backlight module 720 is divided into several backlight subareas as illustrated in FIG. 2.

The driving element 730 is connected to the display panel 710. The driving element 730 is configured to display each picture with two frame images. The two frame images are respectively a first frame image and a second frame image. Through a mutual compensation between the first frame image and the second frame image, a picture corresponding to the input signal is displayed for a user. In the present embodiment, driving voltages for two adjacent sub-pixels in each of the frame images are different, and driving voltages in the first frame image and the second frame image for each of the sub-pixels are different; i.e., the driving voltage for each sub-pixel of the first frame image is reverted to be the driving voltage for each sub-pixel in the second fame image. The driving voltage of the driving element 730 driving each sub-pixel can be looked up and acquired utilizing the LUT. In particular, in the LCD device, the LUT will be pre-stored in the hardware frame buffer. The LUT is a correspondence table on the picture input signals and the driving voltages for each of the sub-pixels in the first frame image and the second frame image which are corresponding to the input signals. The driving element 730 includes a timing controller (TCON) circuit. In an embodiment, the LCD further includes a memory device 760 configured to store the LUT.

The backlight control element 740 is connected to the driving element 730. The backlight control element 740 is configured to determine the backlight brightness regulation signals for each of the backlight subareas according to driving voltages of a first frame image area and a second frame image area which are corresponding to each of the backlight subareas. The backlight regulation signals are grouped signals ($A_{M\_P1}$ and $A_{M\_P2}$, P is the target color sub-pixel) to respectively regulate the backlight brightness of the backlight subareas corresponding to the first frame image and the second frame image. And the number of groups of backlight brightness regulation signals is identical to the number of types of color sub-pixels, so as to perform an independent backlight brightness control to various color sub-pixels. For instance, in the present embodiment, color sub-pixels include red sub-pixels (R sub-pixels), green sub-pixels (G sub-pixels) and blue sub-pixels (B sub-pixels), therefore each group of backlight brightness regulation signals includes a R sub-pixel backlight brightness regulation signal group, a G sub-pixel backlight brightness regulation signal group, and a B sub-pixel backlight brightness regulation signal group to perform independent backlight brightness regulation control to various color sub-pixels in each of the backlight subareas.

Figure 8:
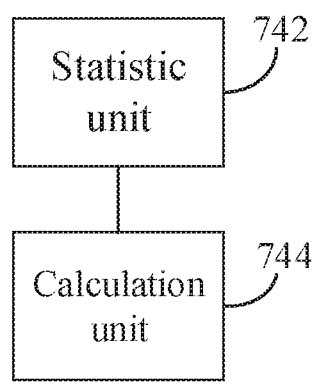
FIG. 8 is a block diagram of a structure of a backlight control element according to an embodiment.

The backlight control element 740 includes a memory and one or more processors. The memory has stored computer-readable instructions that can be executed by the one or more processors. When the computer executable instruction is to be executed by the one or more processors, the one or more processors will execute the steps in the following units, as illustrated in FIG. 8. The formula the statistic unit 742 is configured with to calculate the average driving voltages for various color sub-pixels in the first frame image area corresponding to each of the backlight subareas is as follows:

$$P_{M\_ave1}=\text{Ave}(P_{M\_n\_TL}, P_{M\_n+1\_TH}, P_{M\_n+2\_TL}, \ldots ),$$
$$n=1, 2, 3 \ldots$$

Therein, P is the target color sub-pixel, M is the serial number for the backlight subarea, ave1 is the average driving voltage value of the first frame image; and n is the serial number of P sub-pixel in backlight subarea M.

In particular, the average driving voltage for various color sub-pixels is calculated as:

$$R_{M\_ave1}=\text{Ave}(R_{M\_n\_TL}, R_{M\_n+1\_TH}, R_{M\_n+2\_TL}, \ldots ),$$
$$n=1, 2, 3 \ldots ;$$

$$G_{M\_ave1}=\text{Ave}(G_{M\_n\_TH}, G_{M\_n+1\_TL}, G_{M\_n+2\_TH}, \ldots ),$$
$$n=1, 2, 3 \ldots ;$$

$$B_{M\_ave1}=\text{Ave}(B_{M\_n\_TL}, B_{M\_n+1\_TH}, B_{M\_n+2\_TL}, \ldots ),$$
$$n=1, 2, 3 \ldots .$$

The calculation unit 744 is configured to calculate a backlight brightness regulation signal according to the average driving voltage, a reference backlight brightness signal and a reference driving voltage of each of the backlight subareas. The reference backlight brightness signal refers to a backlight brightness signal that is required when a high low voltage compensation is not performed (i.e., in conventional driving method). The reference driving voltage refers to the driving voltage for various sub-pixels when the high low voltage compensation is not performed. As backlight sources corresponding to various color sub-pixels in each subarea are controlled independently, the backlight brightness regulation signals of the backlight sources corresponding to various color sub-pixels in each subarea needs to be calculated. The formulas to calculate the backlight brightness regulation signal of each color sub-pixel in each of the backlight subareas M are:

$$A_{M\_P1}*P_{M\_ave1}=A_{M\_P2}*P_{M\_ave2};$$

$$2*A_{M\_P}*P_{M\_ave}=A_{M\_P1}*P_{M\_ave1}+A_{M\_P2}*P_{M\_ave2}.$$

P is the target color sub-pixel; M is the serial number of the backlight subarea. $A_{M\_P1}$ is the backlight brightness regulation signal configured to perform the backlight brightness regulation to the backlight source of the P sub-pixel in the backlight subarea M corresponding to the first frame image of the next picture. $A_{M\_P2}$ is the backlight brightness regulation signal configured to perform the backlight brightness regulation to the backlight source of the P sub-pixel in the backlight subarea M corresponding to the second frame image of the next picture. $P_{M\_ave1}$ is the average value of the driving voltage of the P sub-pixel in the backlight subarea M corresponding to the first frame image of the next picture. In the present embodiment, as the driving voltage of sub-pixel is matched with the input signal (i.e., the gray scale of the corresponding color), thereby allowing the average value of the driving voltage to be an evaluating index of the viewing angle brightness of the color sub-pixel. $P_{M\_ave2}$ is the average value of the driving voltage of the P sub-pixel in the backlight subarea M corresponding to the second frame image of the next picture. $A_{M\_P}$ is the reference backlight brightness signal of the P sub-pixel in the backlight subarea M corresponding to the image of the current picture. $P_{M\_ave}$ is the average value of the reference driving voltage of the P sub-pixel in the frame image region corresponding to the backlight subarea M on the image of the current picture. In particular, $P_{M\_ave1}=Ave(P_n+P_{n+1}+P_{n+2}+\ldots)$, $n=1, 2, 3 \ldots$ The backlight regulation element 750 is respectively connected to the backlight control element 740 and backlight module 720. The backlight regulation element 750 is configured to perform independent brightness regulations to the backlight sources of various color sub-pixels in the backlight subarea corresponding to each of the frame images of the next picture according to the backlight brightness regulation signal of each of the backlight subareas, such that the compensated image brightness is the same with the image brightness that is not being high and low voltage compensated.

The above LCD device, by displaying each picture with two frame images sequentially, each of the frame images is alternately driven by high and low voltage signals, and the high and low driving voltages of the first frame image and second frame image are reverted, and the backlight brightness regulation signals of the next picture are generated in accordance to each driving voltage to perform independent backlight regulation to the backlight sources of various color sub-pixels in the corresponding backlight subarea in each of the frame images of the next picture. The above LCD, aided with a compensation to the brightness of each of the backlight subareas M, not only can maintain the overall panel brightness to be the same with the brightness of the uncompensated conventional driving, but also can effect a low color shift viewing angle compensation and avoid the original uncomfortable blink notable to the eyes and caused by high and low voltage switching difference in the driving, thereby effectively ameliorating the color shift defect of LCD in large viewing angle refraction mismatch. The above LCD can effect a coordinated driving in timing and space. Also, by employing the LCD above, the pixels of the LCD device are no longer needed to be divided into primary and secondary sub-pixels, thereby greatly reducing the process complexity and remarkably increasing the penetration rate and resolution of the LCD panel and reducing the cost of backlight design.

A person skilled in the art should understand the processes of the methods in the above embodiments can be, in full or in part, implemented by computer programs instructing underlying hardware, the programs can be stored in a computer-readable storage medium, the program can include the processes in the embodiments of the various methods when it is being executed. The storage medium can be a disk, a CD, a Read-Only Memory (ROM) and other non-volatile storage mediums or Random Access Memory (RAM) and so on.

The different technical features of the above embodiments can have various combinations which are not described for the purpose of brevity. Nevertheless, to the extent the combining of the different technical features do not conflict with each other, all such combinations must be regarded as within the scope of the disclosure.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall within the protection scope of the present disclosure. Therefore, the protection scope of the present disclosure shall be subject to the protection scope of the claims.

What is claimed is:

1. A method for driving a liquid crystal display (LCD) device, comprising:
    displaying each picture with two frame images sequentially; wherein the two frame images comprise a first frame image and a second frame image;
    driving voltages for two adjacent sub-pixels in each of the frame images are different, and driving voltages in the first frame image and the second frame image for each of the sub-pixels are different;
    determining backlight brightness regulation signals for each backlight subarea according to the driving voltages of the first frame image area and the second frame image area, wherein the first frame image area and the second frame image area are corresponding to the backlight subarea; wherein the backlight regulation signals are grouped signals, the number of the groups is identical to the number of types of the color sub-pixels; and
    performing independent brightness regulations to backlight sources of various color sub-pixels in the backlight subarea in each of the frame images of a next picture according to the backlight brightness regulation signal of the backlight subarea.

2. The method for claim 1, wherein the driving voltages for each of the sub-pixels in the first frame image and the second frame image are looked up and acquired utilizing a Look-up Table (LUT) according to an input signal of the picture.

3. The method for claim 2, further comprising the step of pre-storing the LUT.

4. The method for claim 1, wherein the step of determining backlight brightness regulation signals for the backlight subarea according to the driving voltages of the first frame image area and the second frame image area comprises:
    calculating average driving voltages for various color sub-pixels in the first frame image area and the second frame image area, wherein the first frame image area and the second frame image area are corresponding to each of the backlight subareas; and
    calculating the backlight brightness regulation signal according to the average driving voltage, a reference backlight brightness signal and a reference driving voltage.

5. The method for claim 4, wherein in the step of calculating the backlight brightness regulation signal according to the average driving voltage, the reference backlight brightness signal and the reference driving voltage, the formulas to calculate the backlight brightness regulation signal of each of the color sub-pixels in each of the backlight subareas are:

$$A_{M\_P1} * P_{M\_ave1} = A_{M\_P2} * P_{M\_ave2};$$

$$2 * A_{M\_P} * P_{M\_ave} = A_{M\_P1} * P_{M\_ave1} + A_{M\_P2} * P_{M\_ave2};$$

wherein P is a target color sub-pixel; M is a serial number of the backlight subarea, $A_{M\_P1}$ is the backlight brightness regulation signal to perform the backlight brightness regulation to the backlight source of a P sub-pixel in a backlight subarea M corresponding to the first frame image of the next picture; $A_{M\_P2}$ is the backlight brightness regulation signal to perform a backlight brightness regulation to the backlight source of the P sub-pixel in the backlight subarea M corresponding to the second frame image of the next picture; $P_{M\_ave1}$ is an average value of the driving voltage of the P sub-pixel in the backlight subarea M corresponding to the first frame image of the current picture; $P_{M\_ave2}$ is an average value of the driving voltage of the P sub-pixel in the backlight subarea M corresponding to the second frame image of the current picture; $A_{M\_P}$ is the reference backlight brightness signal of the P sub-pixel in the backlight subarea M corresponding to the image of the current picture; $P_{M\_ave}$ is the average value of the reference driving voltage of the P sub-pixel in the frame image area corresponding to the backlight subarea M on the image of the current picture.

6. The method for claim 1, wherein the types of color sub-pixels in each of the frame images comprises at least a red sub-pixel, a green sub-pixel and a blue sub-pixel; the backlight brightness regulation signals comprise a red sub-pixel backlight brightness regulation signal, a green sub-pixel backlight brightness regulation signal and a blue sub-pixel backlight brightness regulation signal, to perform independent backlight regulations to the various color sub-pixels.

7. An LCD device, comprising:
a display panel;
a backlight module configured to provide backlight to the display panel; the backlight module is divided into a plurality of backlight subareas;
a driving element connected to the display panel and configured to display each picture with two frame images sequentially; the two frame images comprise a first frame image and a second frame image; driving voltages for two adjacent sub-pixels in each of the frame images are different, and driving voltages in the first frame image and the second frame image for each of the sub-pixels are different;
a backlight control element connected to the driving element, the backlight control element is configured to determine backlight brightness regulation signals for each of the backlight subareas according to the driving voltages of a first frame image area and a second frame image area, wherein the first frame image area and the second frame image area are corresponding to each of the backlight subareas; the backlight regulation signals are grouped signals, the number of the groups is identical to the number of types of the color sub-pixels; and
wherein independent brightness regulations are performed to a backlight source of various color sub-pixels in the corresponding backlight subarea in each of the frame images of a next picture according to the backlight brightness regulation signals of each of the backlight subareas.

8. The LCD device of claim 7, further comprising a storage element configured to store an LUT; wherein the LUT is a correspondence table on input signals and the driving voltages for each of the sub-pixels in the first frame image and the second frame image, wherein the first frame image area and the second frame image area are corresponding to the input signals; the driving element acquires the driving voltages for each of the sub-pixels of the first frame image and the second frame image by looking in the LUT.

9. The LCD device of claim 7, wherein the backlight compensation control part comprises a memory and one or more processors; the memory has stored computer executable instructions that are executable by the at least one memory, when a computer executable instruction is being executed by the one or more processors to perform operations comprising:
calculating average driving voltages for various color sub-pixels in the first frame image area and the second frame image area, wherein the first frame image area and the second frame image area are corresponding to each of the backlight subareas; and
calculating the backlight brightness regulation signal according to the average driving voltage, a reference backlight brightness signal and a reference driving voltage of each of the backlight subareas.

10. The LCD device of claim 9, wherein the formulas to calculate the backlight brightness regulation signal of each of the color sub-pixels in each of the backlight subareas are:

$$A_{M\_P1} * P_{M\_ave1} = A_{M\_P2} * P_{M\_ave2};$$

$$2 * A_{M\_P} * P_{M\_ave} = A_{M\_P1} * P_{M\_ave1} + A_{M\_P2} * P_{M\_ave2};$$

wherein P is a target color sub-pixel; M is a serial number of the backlight subarea, $A_{M\_P1}$ is the backlight brightness regulation signal to perform the backlight brightness regulation to the backlight source of a P sub-pixel in a backlight subarea M corresponding to the first frame image of the next picture; $A_{M\_P2}$ is the backlight brightness regulation signal to perform a backlight brightness regulation to the backlight source of the P sub-pixel in the backlight subarea M corresponding to the second frame image of the next picture; $P_{M\_ave1}$ is an average value of the driving voltage of the P sub-pixel in the backlight subarea M corresponding to the first frame image of the current picture; $P_{M\_ave2}$ is an average value of the driving voltage of the P sub-pixel in the backlight subarea M corresponding to the second frame image of the current picture; $A_{M\_P}$ is the reference backlight brightness signal of the P sub-pixel in the backlight subarea M corresponding to the image of the current picture; $P_{M\_ave}$ is the average value of the reference driving voltage of the P sub-pixel in the frame image area corresponding to the backlight subarea M on the image of the current picture.

11. The LCD device of claim 7, wherein the backlight source is a white backlight source, an RGB backlight source, an RGBW backlight source or an RGBY backlight source.

12. An LCD device, comprising:
a display panel;
a backlight module configured to provide backlight to the display panel; the backlight module is divided into a plurality of backlight subareas;
a driving element connected to the display panel and configured to display each picture with two frame images sequentially; the two frame images comprise a first frame image and a second frame image; driving voltages for two adjacent sub-pixels in each of the frame images are different, and driving voltages in the first frame image and the second frame image for each of the sub-pixels are different;

a backlight control element connected to the driving element, the backlight control element is configured to determine backlight brightness regulation signals for each of the backlight subareas according to the driving voltages of a first frame image area and a second frame image area, wherein the first frame image area and the second frame image area are corresponding to each of the backlight subareas; the backlight regulation signals are grouped signals, the number of the groups is identical to the number of types of the color sub-pixels; and wherein independent brightness regulations are performed to a backlight source of various color sub-pixels in the corresponding backlight subarea in each of the frame images of a next picture according to the backlight brightness regulation signals of each of the backlight subareas;

wherein the backlight control part comprises one or more processors, and memory storing instructions, which, when executed by the one or more processors cause the one or more processors to perform operations comprising:

calculating average driving voltages for various color sub-pixels in the first frame image area and the second frame image area, wherein the first frame image area and the second frame image area are corresponding to each of the backlight subareas; and calculating the backlight brightness regulation signal according to the average driving voltage, a reference backlight brightness signal and a reference driving voltage of each of the backlight subareas, the calculation formula is as follows:

$$A_{M\_P1} * P_{M\_ave1} = A_{M\_P2} * P_{M\_ave2};$$

$$2 * A_{M\_P} * P_{M\_ave} = A_{M\_P1} * P_{M\_ave1} + A_{M\_P2} * P_{M\_ave2};$$

wherein P is a target color sub-pixel; M is a serial number of the backlight subarea, $A_{M\_P1}$ is the backlight brightness regulation signal to perform the backlight brightness regulation to the backlight source of a P sub-pixel in a backlight subarea M corresponding to the first frame image of the next picture; $A_{M\_P2}$ is the backlight brightness regulation signal to perform a backlight brightness regulation to the backlight source of the P sub-pixel in the backlight subarea M corresponding to the second frame image of the next picture; $P_{M\_ave1}$ is an average value of the driving voltage of the P sub-pixel in the backlight subarea M corresponding to the first frame image of the current picture; $P_{M\_ave2}$ is an average value of the driving voltage of the P sub-pixel in the backlight subarea M corresponding to the second frame image of the current picture; $A_{M\_P}$ is the reference backlight brightness signal of the P sub-pixel in the backlight subarea M corresponding to the image of the current picture; $P_{M\_ave}$ is the average value of the reference driving voltage of the P sub-pixel in the frame image area corresponding to the backlight subarea M on the image of the current picture.

13. The LCD device of claim 12, further comprising a storage element configured to store an LUT; wherein the LUT is a correspondence table on input signals and the driving voltages for each of the sub-pixels in the first frame image and the second frame image, wherein the first frame image area and the second frame image area are corresponding to the input signals; the driving element acquires the driving voltages for each of the sub-pixels of the first frame image and the second frame image by looking in the LUT.

14. The LCD device of claim 12, wherein the backlight source is a white backlight source, an RGB backlight source, an RGBW backlight source or an RGBY backlight source.

* * * * *